Patented Apr. 16, 1935

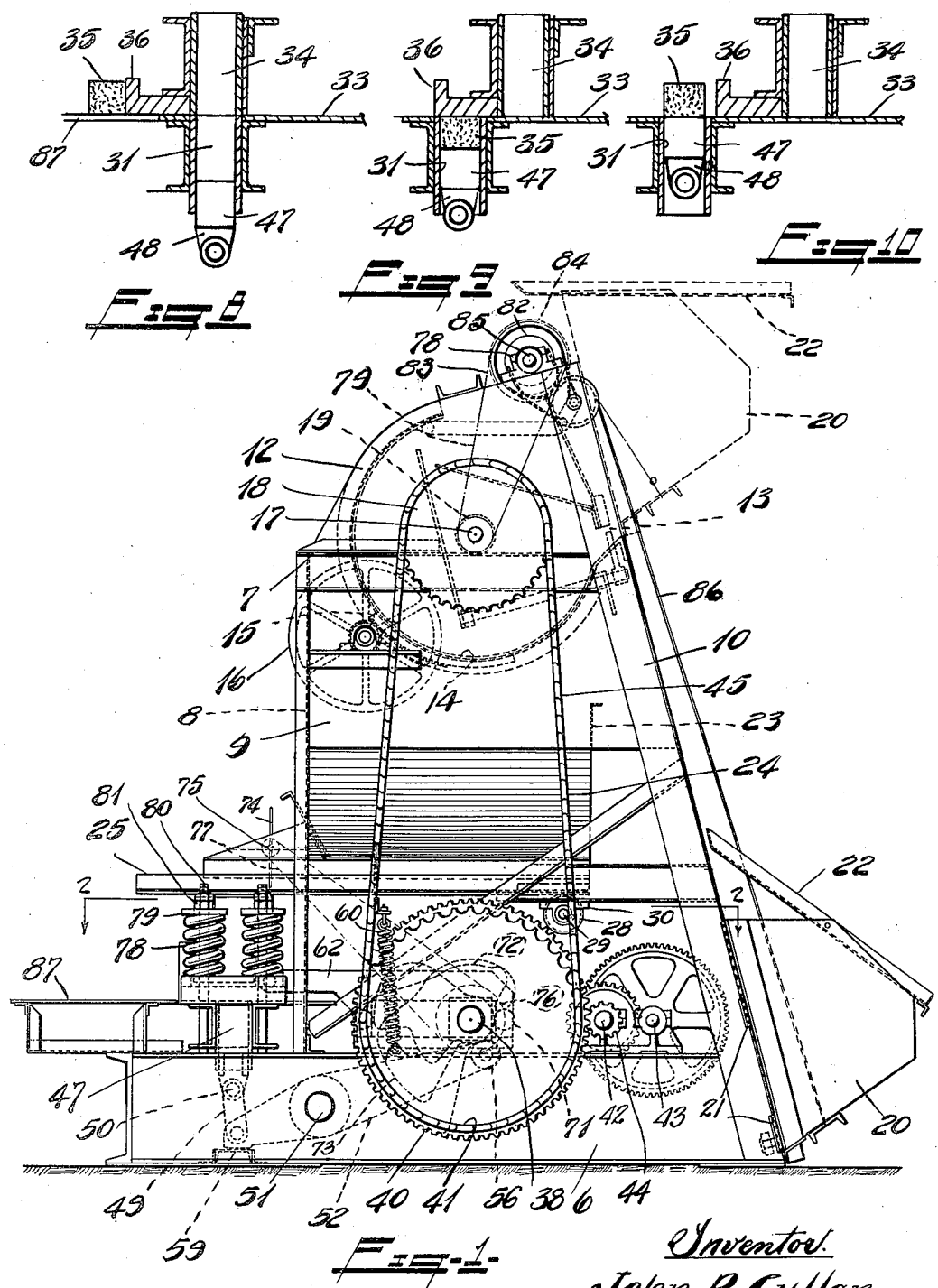

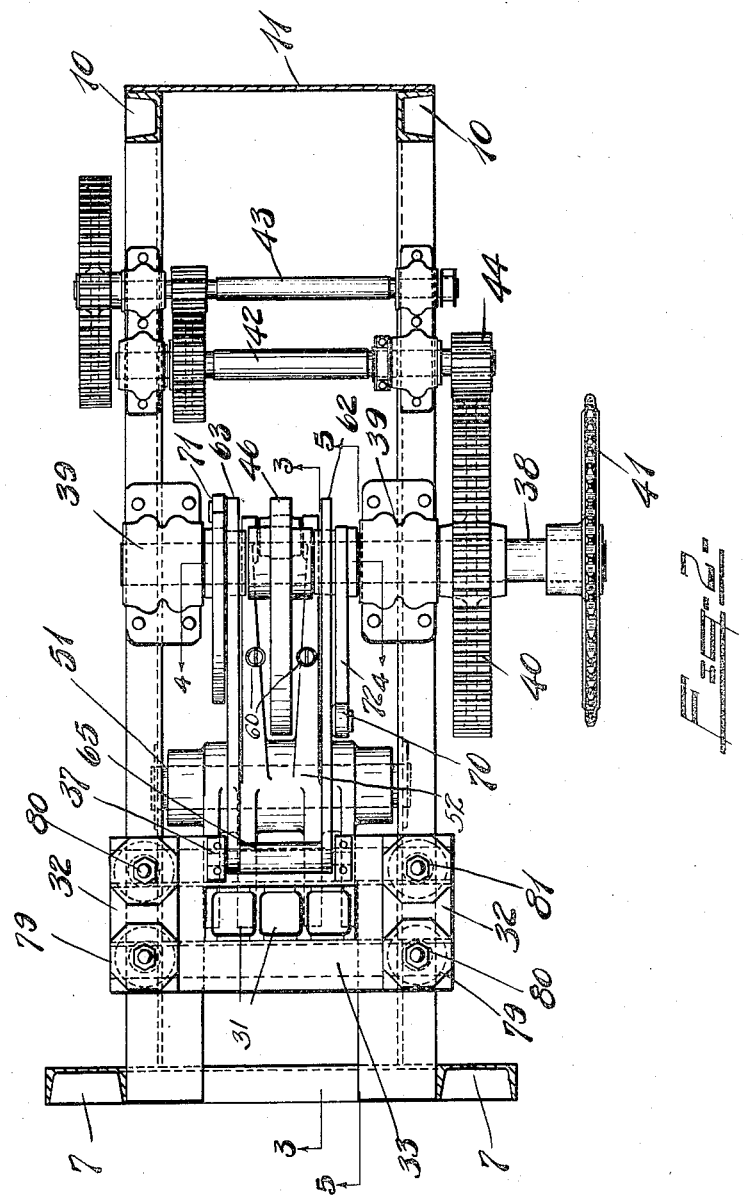

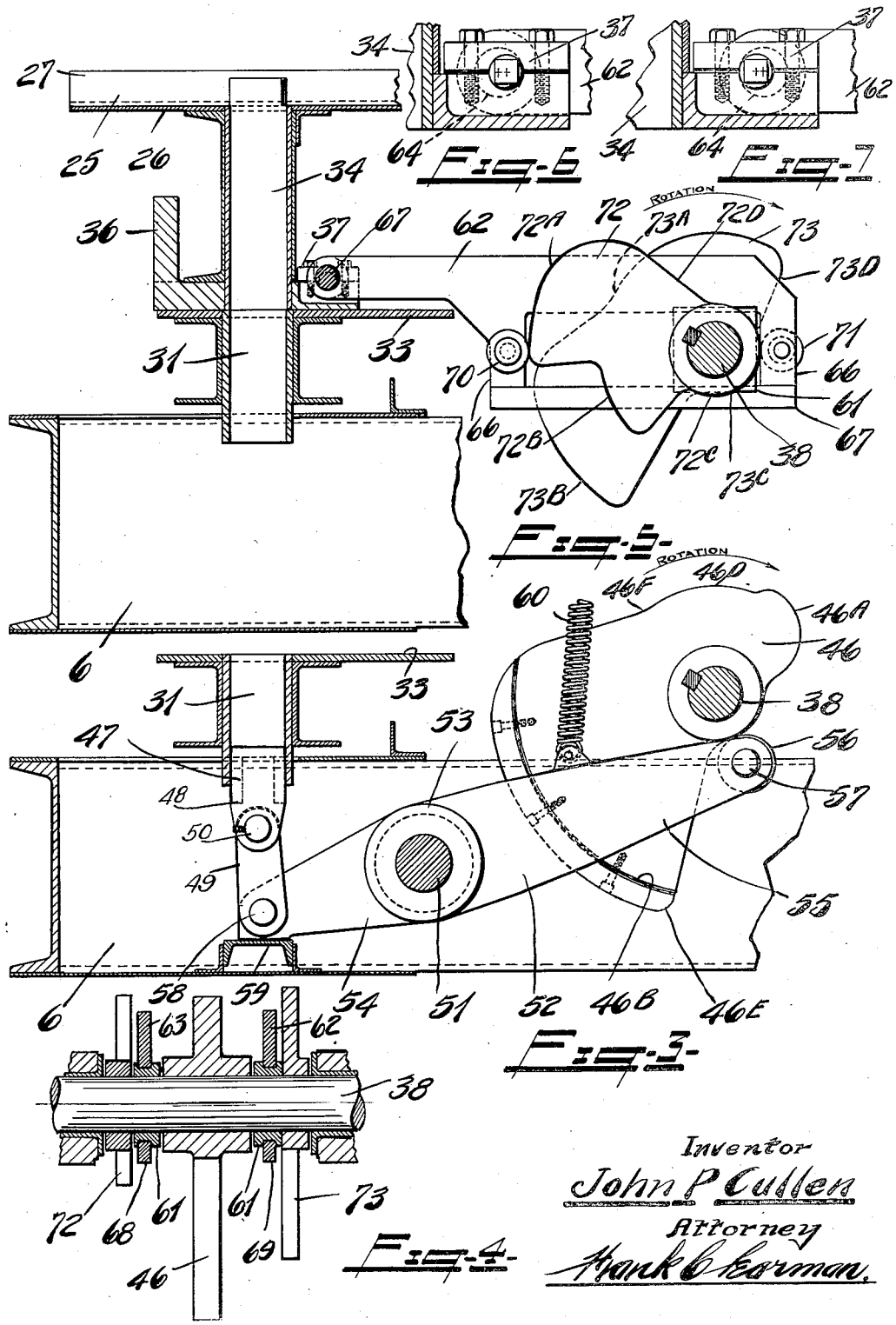

1,997,813

UNITED STATES PATENT OFFICE 1,997,813

BRIQUETTING MACHINE

John P. Cullen, Bay City, Mich., assignor to Industrial Brownhoist Corporation, Bay City, Mich., a corporation of Ohio Application May 6, 1932, Serial No. 609,575

8 Claims. (Cl. 25—87)

My invention relates to briquetting machines and more specifically to a machine provided with a novel correlation of cams and other operating mechanisms, and with a plurality of molds into which a mixture of comminuted material and a bonding agent is fed and bonded under great pressure so that a solid and compact briquette, devoid of interstices, is produced.

One object of the invention is to provide an arrangement of parts so correlated and timed that the molds will be progressively charged, the charges compressed into briquettes, and the briquettes forced from the molds into a position to be moved from the machine on subsequent operating cycles.

Another object of the invention is to provide a reciprocating feeding means for charging the molds, together with complemental means for advancing and retracting the feeding means, and further provide means for adjusting the feeding means relatively to the molds to compensate for misalignment or wear in the advancing and retracting means.

A further object is to produce a new and improved machine for compressing loose material into a compact mass or briquette, which is strong and substantial and yet simple in construction, and which is provided with resilient means to absorb abnormal strains when the material is being compressed.

With the above and other objects in view, the present invention consists in the combination and correlation of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a side elevation of my improved briquetting machine, the solid lines indicating the skip or bucket in position for loading, the dotted lines showing it in its raised or discharging position.

Fig. 2 is a sectional plan view taken on the line 2—2 of Fig. 1.

Fig. 3 is an enlarged fragmentary sectional side view taken on the line 3—3 of Fig. 2, showing one of the molds, a compressing plunger, and the operating cam, together with the necessary intermediary mechanisms.

Fig. 4 is a section taken on the line 4—4 of Fig. 2.

Fig. 5 is an enlarged view, part sectional, taken on the line 5—5 of Fig. 2, showing the assembly of the mold feeding means, a mold, the complemental cams for advancing and retracting the mold feeding means, and the intermediary means for operating the feeding means by said cams.

Fig. 6 illustrates the means provided for adjusting the feeding means relatively to the molds, the feeding means being shown at the forward limit of adjustment.

Fig. 7 is a view similar to Fig. 3 showing the rearward limit of adjustment.

Fig. 8 is a fragmentary sectional view showing the mold feeding means as registered with the mold to discharge its contents, and a briquette pushed away from the mouth of the mold by the pressure plate.

Fig. 9 is a view similar to Fig. 8 illustrating the mold feeding means moved back, with the pressure or mold closing plate in position for the plunger to compress the charge in the mold.

Fig. 10 is also a similar view illustrating the mold feeding means at the end of its rearward travel, and in position to receive a new charge of material, the compressing plunger being shown at the upper limit of its travel with a briquette in position to be pushed forward by the pressure plate as the feeding means with a subsequent charge, is moved forward to again register with the mold.

In the illustrated embodiment of my invention there is shown a base 6 on which a structural frame 7 is mounted, which together support the necessary apparatus required for a machine of the kind in question. The front end and the sides of the frame 7 are vertical and are covered with plates 8 and 9 as usual. The rear end, which is inclined forwardly from the vertical, is made up of beam members 10 and a plate 11. The beams 10 extend from the base 6 to the top of the frame 7, and lie in planes of the side plates 8 and 9 to which they are fastened.

At the top of the frame 7 and extending transversely between the side plates 8 is a cylindrical shaped hopper 12 with a charge receiving opening 13 in its periphery which extends substantially from a horizontal plane passed through the axis of the cylinder upwardly and forwardly to a vertical axial plane. The hopper 12 is further provided with a discharge opening 14 at the bottom thereof, and a gate 15 normally forms a closure for said opening, said gate being manually operated by means of a handwheel and gear arrangement 16. A transversely disposed shaft 17 extends through the cylindrical hopper and side plates 8, and is journaled to the frame 7, a sprocket 18 being mounted on one end thereof (see Fig. 1), and a relatively smaller sprocket 19 is provided on the opposite end, said shaft being also provided with blades (not shown), to thoroughly mix the comminuted material and the bonding agent.

A skip 20 is slidably secured to the channels 19 by means of guides 21, one side and its top being open, the open side facing toward the plate 11, which plate extends from the base 6 to the opening 13 in the hopper 12, and is the means for keeping the charge in the skip until it reaches the upper end of the plate, where the charge passes into the hopper 12 through the opening 13 when the skip is hoisted to the top of the frame. The material to be compressed into briquettes is shoveled, or otherwise fed, into the skip 20 through a screen 22 which is fastened to the skip across the top opening.

The lower ends of the side plates 9 are flared inwardly toward the center of the frame, which, together with the front vertical plate 8 and a rear vertical plate 23, forms a storage bin 24 to receive the mixed material from the hopper 12. The lower end of the plate 8 does not extend as far down as the ends of the flared plates 9, thus providing an opening to allow the material in the storage bin 24 to be forced out, forwardly, by a reciprocating table 25, which is directly below the inwardly flared ends of the plates 9, and which extends from the rear of the bin 24 forwardly and somewhat beyond the side plates 9 of the bin 24.

The table 25 comprises a horizontally disposed plate 26, which is provided with an opening near its forward end, together with two material retaining angles 27 which are fastened to the plate 26 at its horizontal edges with their freed legs upright. The rear end of the table 25 is supported by rollers 28, which are mounted on the frame 7 through the medium of a shaft 29 and bearings 30.

Resiliently mounted on the base 6 in front of the frame 7 is a mold box 31, which carries guides 32 and an apertured plate 33. Slidably mounted on the plate 33 and within the guides 32 is a feed box 34; this feed box extends from the plate 33 upwardly to the underside of the reciprocating table 25 to which it is fastened, registering with the opening in the plate 26, and is the means for supporting the forward end of the table 25.

To counteract the upward thrust or pressure produced when the material in the mold is being compressed into briquettes 35, an L-shaped pressure plate 36 is provided, and it is attached to the front side of the feed box 34, and within the guides 32. A pair of spaced apart bearings 37 are fastened to the foot of the feed box 34 and to the rear thereof.

A cam-carrying shaft 38 is journaled in bearings 39 which are mounted on the base 6, and a gear and sprocket 40 and 41 respectively are mounted thereon, said shaft being driven by a motor or other means (not shown), through intermediate shafts 42 and 43 and their respective gears, the gear 44 meshing with the gear 40, and a chain 45 encompasses the sprockets 41 and 18 for driving the shaft 17.

The novel correlation of cams referred to in the preamble of this specification, is mounted on the shaft 38 in spaced apart relation, and the cycle of operation is substantially as follows:

A cam 46, whose primary function is to operate the material compressing mechanisms, is keyed to the shaft 38 midway between the side members of the base 6, the peripheral contour being composed of surfaces 46A, 46B, 46C, 46D, and 46E, as plainly indicated in Fig. 3 of the drawings. That part of the cam's periphery, designated by the symbol 46A, is employed during the compressing of the material in the molds, and the part 46B functions to force or strip the briquettes out of the molds. To insure a perfect alignment of the top faces of the compressing plungers with the top surface of the apertured plate 33, a shoe 46E is removably attached to the cam 46 at 46B, and shims (not shown) may be added or taken out as occasions require.

Compressing plungers 47 are fitted in the molds of the mold box 31, each plunger being provided with a pair of downwardly extending ears 48, to which a connecting link 49 is pivotally connected by means of a pin member 50.

A non-rotatable shaft 51 extends across the base 6 and projects through the side members of the same, a lever 52 being mounted thereon and is provided with a hub 53, said lever being also formed with spaced apart pairs of short arms 54 which project forwardly to and embrace the links 49. A pair of long arms 55 is also formed integral with the hub and extend rearwardly to a point below and just beyond the cam shaft 38; said pair of arms embracing the cam 46, and support at their ends a cam contacting roller 56 which is mounted on a pin 57 that passes through the arms. The shorter pairs of arms carry a through pin 58 on which are threaded the several links 49.

A stop 59 is fastened to the base 6 near the bottom thereof to limit the downward movement of the shorter arms 54, and springs 60 are fastened at their lower ends to the arms 55 and at their upper ends to the frame 7, and are designed to keep the roller 56 against the periphery of the cam 46 during a cycle of operation.

Rectangular-shaped guide blocks or bearings 61 are mounted on the cam shaft 38 on each side of and adjacent to the cam 46, and are grooved on their upper and lower surfaces to accommodate connecting links 62 and 63 which extend from the rear side of the guide block bearings 61 forwardly to the bearings 37 at the foot of the feed box 34 when the latter is in register with the mold box 31. Said connecting links 62 and 63 are provided at their forward ends with pin holes which engage an eccentric pin 64 that passes through the bearings 37 at the foot of the feed box 34. The end of the pin 64, that projects beyond the bearings, is square in cross-section, providing means by which the eccentric pin may be turned in the bearings 37 to adjust the feed box 34 relatively to the mold box 31. It is obvious that any adjustment made by rotating the pin 64 does not affect the travel of the links 62 and 63. Adjustments vary only the distances between the holes in the end of the links and the center of the feed box 34.

A link separating member 65, extends between the connecting links at their front ends and is provided to keep the links in alignment with their relative positions on the cam shaft 38. Depending from the links 62 and 63 are spaced apart arms 66 and 67 respectively, which extend to the grooves in the under surface of the guide blocks 61. Retaining bars 68 and 69 are fitted in the lower grooves of the guide blocks 61 and span the spaces between the depending arms 66 and 67 respectively, and are fastened thereto to keep the links 62 and 63 in sliding engagement with the blocks 61 when the mechanisms are operating. On the forward depending arm 66 of the link 62 and on the outside face thereof is a wrist pin which carries a cam engaging roller 70, and the rear depending arm 67 of the link 63 is likewise provided with a cam engaging roller 71.

Complemental cams 72 with the peripheral surfaces 72A, 72B, 72C, and 72D, and cam 73 with the peripheral surfaces 73A, 73B, 73C, and 73D, are keyed to the cam shaft 38 between the link 62 and one of the bearings 39, and the link 63 and the other bearing 39, respectively. Cam 72 functions to advance the feed box 34 through the medium of the connecting links 62 and 63, and cam 73 functions to retract the feed box through the same medium.

To prevent any clogging or massing of the mixed material on the reciprocating feed table 25 at the receiving end of the feed box 34, an agitator 74, of any suitable construction, is located just forward of the frame 6, and above the table 25 at a height to permit the ends of the tines or blades thereof to clear the plate 26. The agitator is driven from the shaft 38, sprockets 75 and 76 being mounted on the agitator shaft and cam shaft 38 respectively, and these sprockets are connected by a chain 77 in the usual manner.

When the material is being compressed, the pressure plate 36 covers the mold openings, the ends of the plate slidably engaging beneath the bottom face of guides 32. Spaced apart springs 78 are mounted on these guides, and caps 79 are mounted on the springs, the guides and caps being drilled to accommodate bolts 80 which are anchored to the base, the upper ends of the bolts being threaded to receive nuts 81 in the usual manner, so that the springs may be adjusted as desired.

A conventional hoisting mechanism 82, including the usual drum, clutch, and brake assembly, is located at the top of the frame 7, and in juxtaposition with the channel beams 10. This mechanism is actuated by means of a sprocket chain 83 that passes around the sprocket 19 and a sprocket 84 which is mounted on the hoist shaft 85. A hoist rope 86 is fastened to the skip 20 and leads upwardly to and around the drum of the hoist 82.

A briquette receiving table 87, with the upper face of its plate level with the top face of the plate 33, is located just forward of the mold box 31 to receive the briquettes as they are pushed along the plate 33 by the pressure plate 36.

From the foregoing thoroughgoing description of the constituent parts of my invention, the operation of the machine as a whole will be readily perceived by those skilled in the art.

Normally, the skip 20 is at rest at the lower limit of its travel, and the clutch of the hoist 82 is out of engagement. All other mechanisms, excepting the handwheel mechanism 16, are actuated when the current to the motor (not shown) is turned on.

After the skip 20 has been filled with comminuted material, (the bonding agent may be added before the skip is hoisted or after the material has entered the mixing hopper 12) the hoist clutch is thrown into engagement, thereby actuating the hoisting mechanism, whereupon the rope 86 will be wound in and the skip will be raised to its upper limit of travel, at which point it automatically throws the clutch out of engagement, and the brake is applied to hold it, or it is permitted to return to its filling position by gravity. During the raising of the skip, the contents thereof are held in place by reason of the skip's contact with the plate 11, and the contents begin discharging into the mixing hopper 12 when the open side of the skip passes beyond the upper edge of the plate 11. The mixing process begins the moment the material reaches the hopper; and when the ingredients have been thoroughly mixed, the gate 15 is opened to permit the mixture to discharge onto the reciprocating table 25 which constitutes the bottom of the storage bin 24, after which it is again closed to retain the next of subsequent charges from the skip.

An extreme rearward oscillation of the reciprocating table 25 with the attached and depending feed box 34 brings the opening in the plate 26 under the material from the storage bin 24, thereby allowing the feed box to become filled (see Fig. 10). This extreme rearward movement is brought about by the projection 73B of the cam 73 contacting the roller 71 of the connecting link 62. While the roller 71 is riding the projection 73B, the roller 70 is contacting the cam 72 at its surface 72C, and the shoe 46E, of the cam 46, is approaching the roller 56 of the lever 52, to finish the upward stroke of the plunger 47, and, while the roller 56 rides the shoe 46E, the plunger 47 will be held stationary with its top surface level with the upper face of the plate 33.

When the cam 72 rotates far enough for the surface 72C to leave the roller 70, it will thrust the links 62 and 63 forwardly, thereby advancing the feed box 34 to its forward limit of travel, where it registers with the mold box 31 to charge the same, when the projection 72A meets the roller 70, and it will be held in that position while the roller 70 is riding the cam surface 72A. (See Figs. 5 and 8.) Before the cam projection 72A leaves the roller 70, the cam 46 will have rotated far enough for the roller 56 of the lever 52, to have passed the shoe 46E; the spring 60 will pull the lever arms 55 upwardly, thereby forcing the cam arm 54 downwardly until it meets the stop 59. The plunger 46, of course, is brought down to its lower limit of travel by the action of the lever 52.

The next step in the cycle occurs when the cam surface 73A leaves the roller 70, and the cam surface 73C leaves the roller 71 (see Fig. 10). After the cam surfaces, just above mentioned, have left their respective rollers, a further rotating of the cam shaft 38 will cause the cam surface 73D of the cam 73 to contact the roller 71 of the link 63, which will force the connecting links 62 and 63 backwardly, thereby retracting the feed box 34 and the attached pressure plate 36 until the latter completely covers the mouth of the mold box 31 (see Fig. 9), where it is held stationary until the cam surface 73A passes beyond the roller 71. While the pressure plate 36 is being held against movement over the mold box 31, the cam surface 46A contacts the roller 56 of the lever 52, and forces the arm 55 downwardly and, consequently, the plunger 47 upwardly to compress the material in the mold box 31.

After the compression stroke is finished, the cam surface 46D next contacts the roller 56 which permits the arm 55 to raise and thereby lower the plunger 47 to relieve the pressure in the briquette just made. While the cam surface 46D is riding the roller 56 to keep the plunger idle, the cam surface 73D is contacting the roller 71, which action forces the feed box 34 and pressure plate backwardly to the end of their travel, thereby uncovering the mold box 31. As soon as the cam surface 73B contacts the roller 71 to hold the feed box 34 stationary, the cam surface 36E contacts the roller 56 and further depresses the arm 55, which action raises the plunger 47 to the upper limit of its travel, forcing the briquettes from the mold box 31.

The plunger 47 is held at its upper limit of travel with its top surface level with the slide plate 33 while and when the shoe 46E contacts the roller 56, and while the plunger is in the position just described, the cam surface 73D is contacting the roller 70 and forcing the feed box 34 with a new charge and the pressure plate 36 forwardly through the medium of the links 62 and 63. During this forward movement, the pressure plate 36 encounters the briquettes made in the previous cycle, and forces them forwardly to the receiving table 87.

Having thus described a complete cycle, it is quite apparent that the following sequential order or steps occur during the completion of such cycle:

First. The feed box 34 was filled with material.

Second. The filled feed box was advanced to register with the mold box 31 to discharge its contents into the mold box.

Third. The feed box 34 and pressure plate 36 were retracted until the pressure plate completely covered the mouth of the mold box 31 and held there until the plungers 47 compressed the material in the molds into briquettes.

Fourth. The feed box 34 was further retracted to its original filling position, and the briquettes were forced or stripped out of the molds by the plungers 47, to be pushed forwardly onto the receiving table 87, when the pressure plate 36 encountered the same during the next or subsequent cycles.

What I claim is:

1. A briquetting machine of the class described, comprising a frame, a material mixing hopper, a skip, a storage bin, molds equipped with material compressing and discharging members, means for discharging material from the mixing hopper to said storage bin, a table open to said bin and forming the bottom thereof, means for reciprocating said table to charge said molds, means for progressively actuating the said compressing and discharging members, and yieldable means engageable by said table when said table forms a closure for the open end of the mold.

2. A briquetting machine of the class described comprising a frame including a base, molds mounted on said base, each mold being equipped with a compressing and discharging member, a horizontally disposed reciprocating mold charging and closing means mounted above the molds and adapted in one position to receive material, in a subsequent position to discharge the material into said molds, and in a third position to cover the mouth of the molds, yieldable means on said frame and with which the table engages when said mold charging mechanism covers the mouth of the mold, means for actuating the mold charging and closing means, and means for sequentially operating the compressing and discharging member.

3. In a briquetting machine, the combination with a base, of a plurality of molds equipped with compressing and discharging members, a combination bin closure, mold charging and closing member, a driven shaft, a pair of connecting links slidably mounted thereon and adjustably attached to said combination member for adjusting the molds and combination member relatively to each other, a pair of complemental cams engaging said pair of connecting links for reciprocating the combined member, and a cam mounted on said shaft between the connecting links, for sequentially actuating said compressing and discharging members as the shaft is driven.

4. In a briquetting machine, the combination with a structure having a mold equipped with a plunger, a combined mold charging and mold closing unit, means for feeding material to said combined unit, a shaft, a pair of connecting links slidably mounted on said shaft and adjustably connected to said combined member, complemental cams keyed to the shaft, said cams being engageable with said connecting links for advancing the charging unit to register with the mold and the closing unit to go beyond the mouth of the mold, said cams also retracting the combined member to position the closing unit over the mold, and further retract the combined member to its material receiving position, and a cam keyed to said shaft midway of the complemental cams for sequentially actuating the plunger member to compress the material in the mold when it is covered, and to move the compressed material to the face of the charging unit after the mold is uncovered.

5. In a briquetting machine, the combination with a structure, of a plurality of molds mounted thereon, plungers in said molds, a unitary member comprising a bin closure, mold charger, and mold closing plate slidably mounted on said molds and structure, a driven shaft, a pair of connecting links slidably mounted on said shaft and adjustably connected to said unitary member, complemental cams embracing and engaging said connecting links for reciprocating said links as the shaft is rotated, a compressing cam, a second shaft, a lever journaled on said shaft and formed with opposed short and long bifurcated arms, links connecting the short arms with said plungers, the longer arm embracing and engaging said compressing cam as the driven shaft is actuated.

6. In a briquetting machine, the combination with a structure, of a plurality of molds mounted thereon, plungers in said molds, a unitary member comprising a bin closure, mold charger, and mold closing plate slidably mounted on said molds and structure, vertically yieldable means engageable by said plate when said plate is positioned over the mold, a cam shaft supported transversely of the structure, a pair of connecting links slidably mounted on said shaft and adjustably connected to said unitary member, complemental cams engaging said connecting links for reciprocating them as the shaft is rotated, a compressing cam, a second shaft, a lever journaled on said shaft and provided with bifurcated arms, links connecting the shorter arms with said plungers, the longer arm embracing and engaging said compressing cam, and resilient means fastened to the longer arm and to the structure for holding the longer arm in continuous contact with said compressing cam.

7. In a briquetting machine, the combination with a structure, of a plurality of molds mounted thereon, plungers in said molds, a unitary member comprising a bin closure, mold charger, and mold closing plate slidably mounted on said molds and structure, yieldable means on the frame and engageable by said plate when the plate is positioned to form a closure for the mold, a shaft supported transversely of the structure, a pair of connecting links slidably mounted on said shaft and adjustably connected to said unitary member, complemental cams embracing and engaging said connecting links for reciprocating them as the cam shaft is rotated, a compressing cam, a second shaft, a lever journaled on said shaft and formed with bifurcated short and long arms, links connecting the short arms with the plungers, the long arms embracing and engaging said adjustable compressing cam.

8. In a briquetting machine of the class described comprising a base, a mold box mounted thereon, a plunger mounted in the mold box and means for actuating said plunger including a shaft, a reciprocating feed table having a feed box secured thereto and shiftable into and out of vertical alignment with said mold, vertically yieldable means engaging said table when the table is positioned over the mold, and means for reciprocating said plate including a pair of connecting links slidably mounted on said shaft with their outer ends adjustably connected to said feed box.

JOHN P. CULLEN.